United States Patent

[11] 3,602,373

| [72] | Inventor | Harrison H. Cassel |
| | | Royal Oak, Mich. |
| [21] | Appl. No. | 756,667 |
| [22] | Filed | Aug. 30, 1968 |
| [45] | Patented | Aug. 31, 1971 |
| [73] | Assignee | Palmer-Shile Company |
| | | Detroit, Mich. |

[54] METHOD AND MEANS FOR CONSTRUCTING AND CHANGING LENGTH OF STORAGE RACK BEAMS
2 Claims, 7 Drawing Figs.

[52] U.S. Cl. ................................................. 211/175, 211/177, 287/58
[51] Int. Cl. ..................................................... A47f 5/10, F16b 7/00
[50] Field of Search ......................................... 211/175, 105.3, 182, 177, 148, 176; 287/58; 248/298, 172; 238/243–244, 246–247, 262–263; 108/137; 52/632; 5/184; 297/445

[56] References Cited
UNITED STATES PATENTS

| 1,021,432 | 3/1912 | Smith | 211/175 |
| 1,898,384 | 2/1933 | Noros | 287/58 UX |
| 2,071,397 | 2/1937 | Faries | 238/244 |
| 3,194,407 | 7/1965 | D'Altrui | 211/177 |
| 3,194,408 | 7/1965 | Kimpton | 211/177 |
| 977,671 | 12/1910 | Melander | 5/184 |

Primary Examiner—Ramon S. Britts
Attorney—Harness, Dickey & Pierce

ABSTRACT: An adjustable storage rack having slotted beam-connected columns forming bays. The length of the beams may be changed by cutting them and inserting an overlapping splice member bolted to both sides, a filler piece also being used if the beams are being lengthened. As a variation, beams may be constructed with two standard size end sections, two splice members, and a center section which varies in length according to the bay width desired.

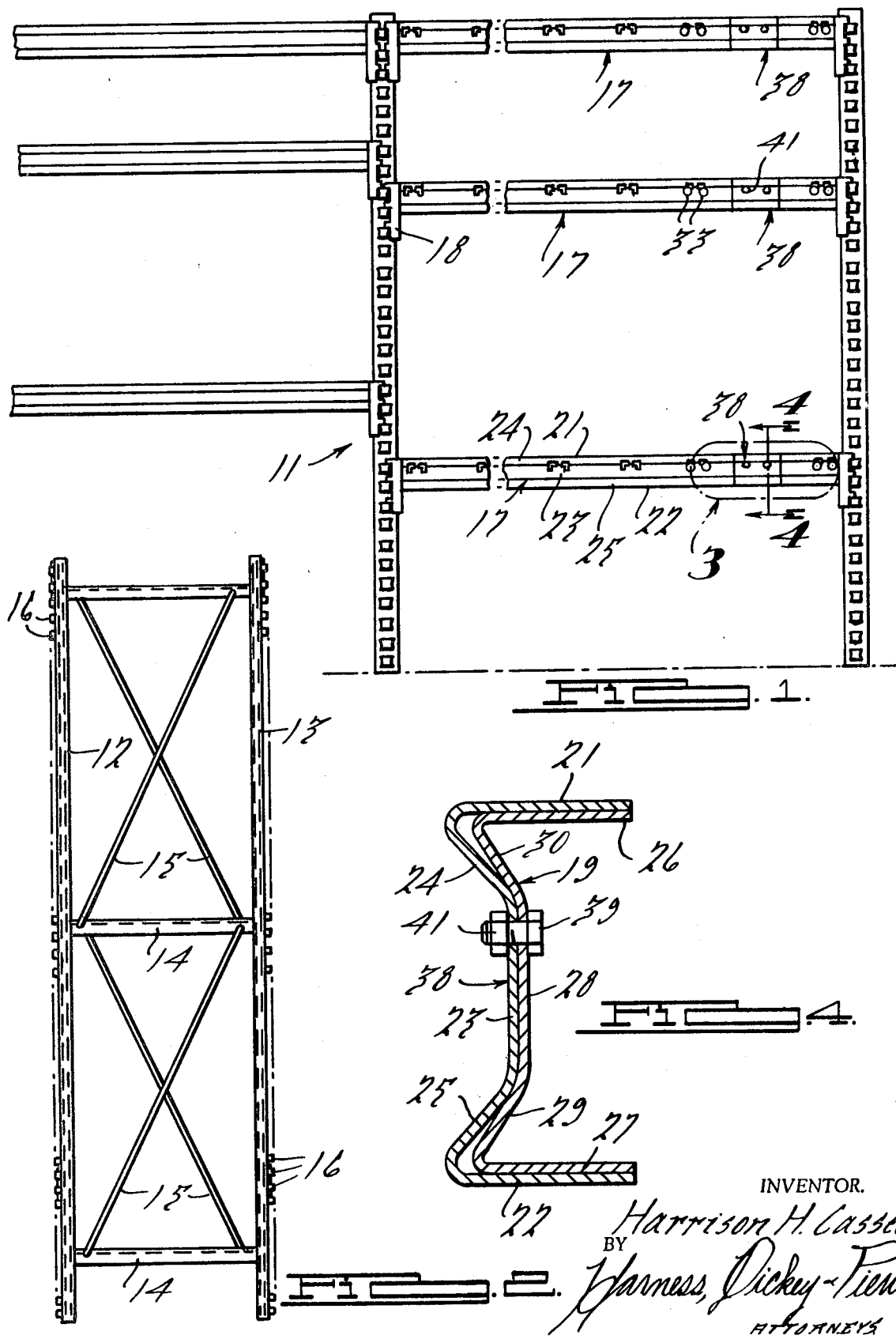

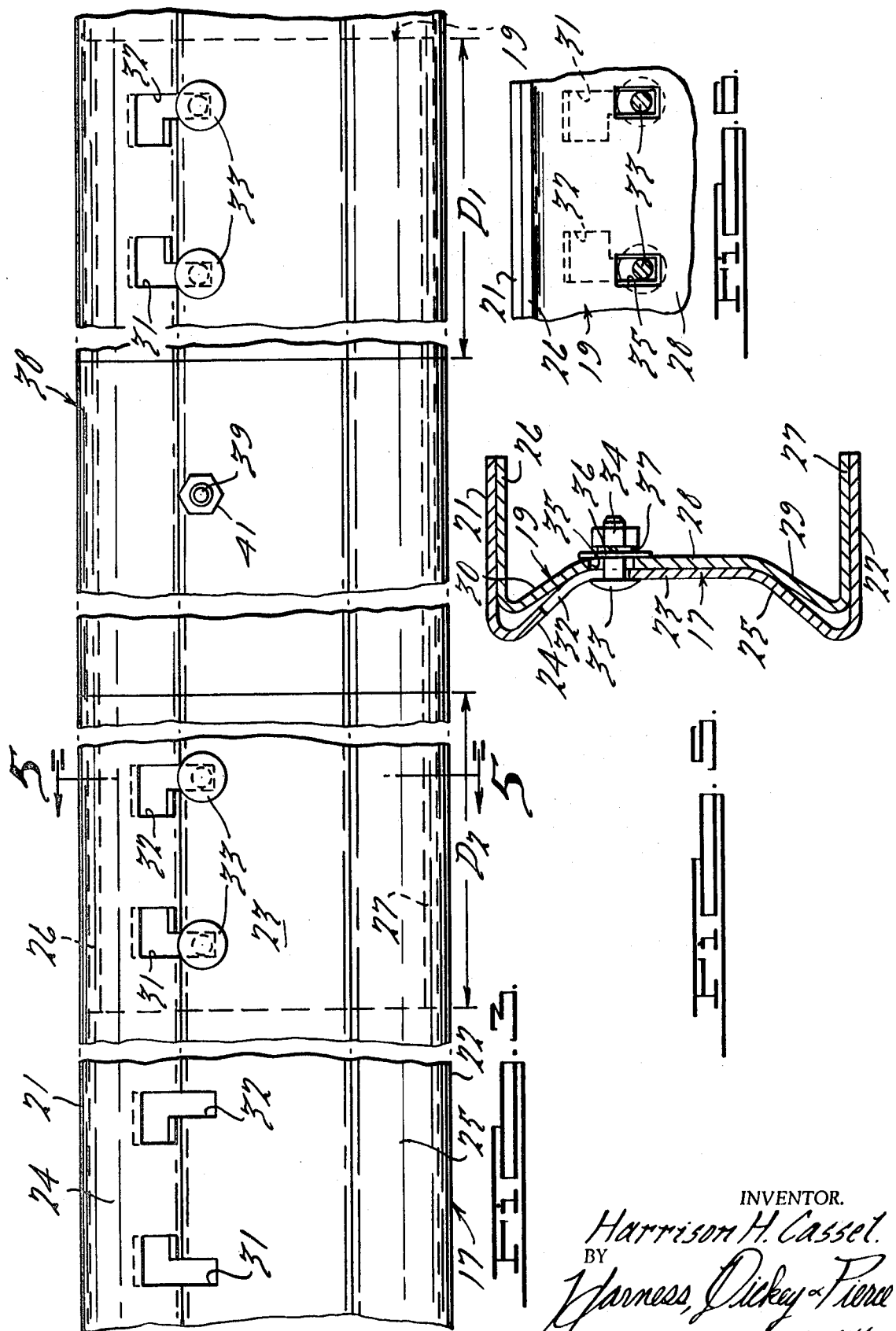

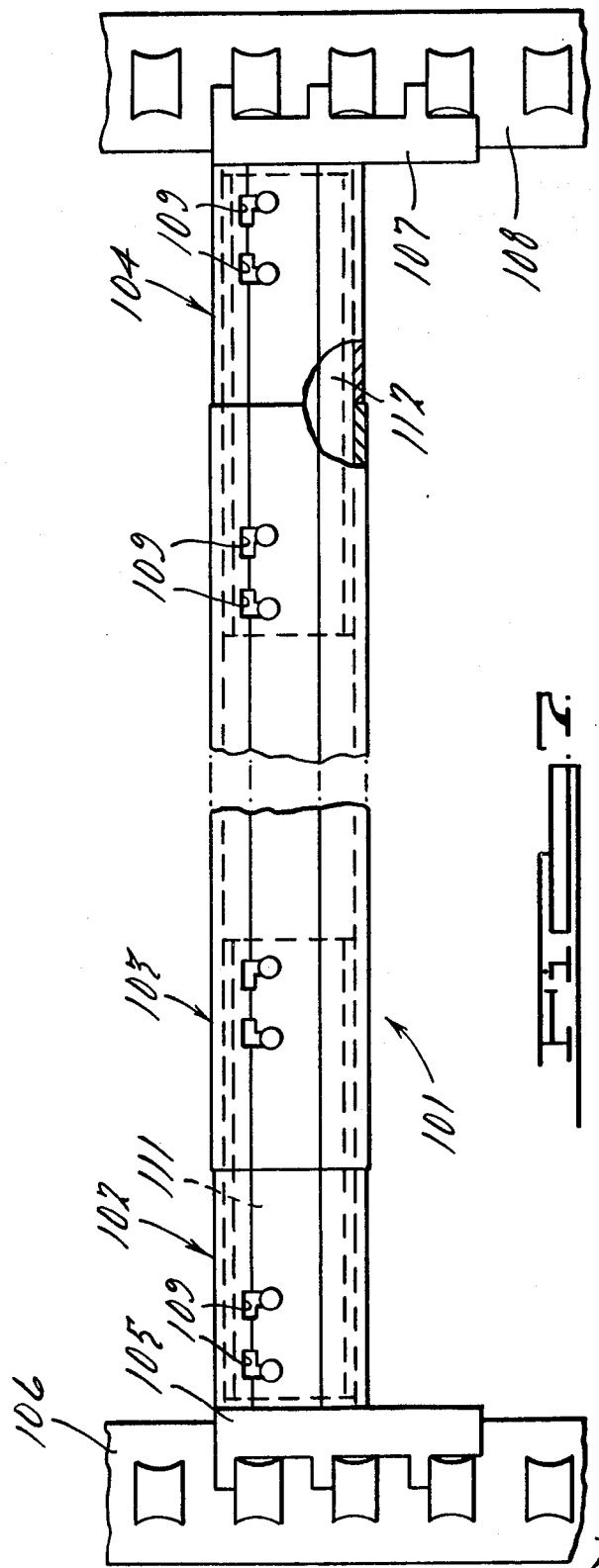

METHOD AND MEANS FOR CONSTRUCTING AND CHANGING LENGTH OF STORAGE RACK BEAMS

BACKGROUND OF THE INVENTION

1. Field of the Invention

The invention relates to adjustable storage racks of the beam type used for industrial purposes, in which the horizontal dimensions of the rack bays may be changed.

2. Description of the Prior Art

In prior storage racks of this type, as exemplified by U.S. Pat. No. 3,194,408 issued Oct. 9, 1962, to John C. Kimpton, the only way of changing the width of bays was for the customer to procure beams of different lengths to substitute for those originally purchased. This involved considerable extra expense and wasted material.

SUMMARY OF THE INVENTION

According to the invention, if it is desired to change the bay width of a rack having the conventional beam construction, each beam in the bay is cut close to one end thereof and a splice member which is shaped like the beam but nestles within it is secured to the two parts of the beam, the splice member being sufficiently long to create the desired total beam length and at the same time being detachably but firmly secured to the original beam parts. If the beam is being shortened, two cuts are made and the proper length removed. If the beam is being lengthened, a filler piece of the same cross-sectional shape as the beam is bolted to the splice member and extends between the facing edges of the original beam parts.

In a modified form of carrying out the invention, the beam originally supplied with the rack is manufactured in three sections, two end sections of standard length having connecting members for the columns, and a central section of variable length depending on the bay width desired. Two splice members are also provided. Thus the bay width may later be changed merely by replacing the central beam section with one of another length.

BRIEF DESCRIPTION OF THE DRAWINGS

FIG. 1 is a front elevational view of a portion of an adjustable storage rack with originally conventional beams but incorporating the principles of the invention;

FIG. 2 is a side elevational view thereof;

FIG. 3 is an enlarged front elevational view of a beam which has been lengthened in accordance with the invention, taken in the area marked 3 of FIG. 1, parts being broken away;

FIG. 4 is a cross-sectional view in elevation taken along the line 4—4 of FIG. 1 and showing the connection between the splice member and the filler piece;

FIG. 5 is a cross-sectional view taken along the line 5—5 of FIG. 3 and showing the connection between one of the original beam parts and the splice member;

FIG. 6 is a fragmentary rear elevational view showing a portion of the splice member and the apertured portions thereof; and FIG. 7 is a side elevational view of another form of the invention in which a three-section beam is provided, thus permitting change of length of the beam.

DESCRIPTION OF THE PREFERRED EMBODIMENTS

Referring first to the invention as applied to changing the bay width of racks with conventional beams, the storage rack is generally indicated at 11 and comprises pairs of front posts 12 and rear posts 13 connected by cross braces 14 and diagonal braces 15. The posts have outwardly facing webs with pressed-out slots 16 at regularly spaced intervals. Beams generally indicated at 17 are provided, extending between adjacent front posts and adjacent rear posts. Each beam has a pair of end members 18 with downwardly extending teeth receivable by slots 16. The general construction is disclosed in the aforementioned U.S. Pat. No. 3,194,408.

The width of a bay between adjacent posts is determined by the length of the beams in that bay. According to the invention, when it is desired to change the width of a bay, this is done by cutting the beams in that bay adjacent one end thereof, the cut being made in either one or two places depending upon whether the beam is to be lengthened or shortened. In the illustrated embodiment, the bay is being shown as being widened so that a single cut is made in each beam. If the beam is to be shortened, two cuts are made and the material between them removed. Of course this would be done with the rack in disassembled condition.

A splice member generally indicated at 19 is provided which connects the two original beam parts and is of sufficient length to create the increased bay width while at the same time being secured firmly to the original parts of the beam. In the illustrated embodiment, as in the aforementioned patent, each beam has an upper horizontal flange portion 21, a lower horizontal flange portion 22, a vertical web portion 23, an upper inclined web portion 24 and a lower inclined web portion 25, these portions being blended into each other by curved connecting radii portions. This construction is like that shown in the aforesaid patent, but the principles of the present invention encompass other shapes of beams.

Splice member 19 is shaped similarly to beam 17 but is adapted to nestle within it. More particularly, the upper and lower horizontal flanges 26 and 27 respectively of splice member 19 fit within flanges 21 and 22, and web 28 of the splice member rests against we 23. The inclined portions 29 and 30 of the splice member are shaped so as not to interfere with their counterparts 24 and 25 on the beam. The outer edges of the flanges on both the splice member and beam preferably match and the splice member is so shaped as to have a snug fit in the beam in order to reinforce it properly.

As shown in FIG. 3, splice member 19 will extend into both parts of the original beam a sufficient distance to enable them to be properly secured thereto and provide proper stiffness to the entire assembly. The cut or cuts will thus be made a sufficient distance from the beam end to permit this overlapping. The overlaps are indicated at $D_1$ and $D_2$ in FIG. 3. If it is desired to stiffen the entire beam an additional amount, this can be done merely by increasing the length of overlap $D_2$ so that it extends will past the central portion of the beam. If this is done for all the beams in a bay, it will increase the load carrying capacity for the entire bay.

Beams 17 are also shown as being provided with a plurality of pairs of L-shaped apertured portions 31 and 32 at evenly spaced intervals in the upper portion of web 23 and upper inclined web portion 24. These slots or apertures could be provided for another purpose not connected with this invention, such as front-to-rear shelf members which are detachably mounted within corresponding front and rear beams 17. If such apertures are provided, they may be used to secure the end portions of splice member 19 to the original beam parts. This would be done by bolts 33 and nuts 34 which extend through apertures 31 and 32 and also through rectangular apertures 35 formed in webs 28 of splice member 19. A washer 36 and a lock washer 37 may also be provided for properly securing bolts 33. As shown, the rectangular apertures 35 overlap the lower portions of the L-shaped slots 3! and 32. It should be noted that the invention is not considered to be limited to the use only of previously provided apertures or slots in the beams.

In order to provide a beam being lengthened with a uniform exterior shape, a filler piece generally indicated at 38 is provided, this filler piece having the same cross-sectional shape as beam 17 and being mounted on the exposed portion of splice member 19. Filler pieces 38 is seen in FIG. 4 and is preferably secured to splice member 19 by one or more bolts 39 and nuts 41. It will be seen that the surfaces of filler piece 38 will be contiguous with the surfaces of the two original beam parts, as seen in FIG. 3. Filler piece 38 will not only improve the appearance of the entire assembly but will facilitate loading of the beams.

It should be noted that bolts 33 and 39 will not carry any appreciable load as far as the material being supported by the beam is concerned, being merely used to keep the parts together.

FIG. 7 illustrates a modified form of the invention in which the beam is so constructed originally as to facilitate changing the bay width. The beam is generally indicated at 101 and comprises three sections, 102, 103, and 104. Sections 102 and 104 are made in a standard length, and serve as the left-hand and right-hand ends respectively of the beam. Section 102 has an end connecting member 105 mountable on a column 106 and section 104 has a similar end connecting member 107 for mounting on column 108. The cross-sectional shape of these two end sections is identical, and this shape is shown as being similar to that of the previous embodiment. The end sections are also provided with L-shaped apertured portions 109, as in the previous embodiment.

Section 103 is of similar cross-sectional shape but may be made of a slightly heavier gauge of metal since the central portion of the beam will take the maximum load. Several sections 103 are made, with varying lengths, and the length which the customer purchases will depend upon the bay width which he desires. The customer will also purchase as part of the beam assembly two splice members 111 and 112.

The beam would be assembled by nestling the two splice members in the two end sections and the portions of the central section adjacent the joints, and bolting them to these sections as in the previous embodiment. It will be noted that while the heavier gauge of metal for the central section will cause a slight irregularity in the upper surface of the beam, this will not create any difficulty with the usual loads involved. The splice members will be bolted to the end and central sections as in the previous embodiment.

If the customer later desired to change the bay width, it is only necessary for him to purchase a central section of a different length rather than purchasing the entire beam, an the end sections and splice members could be utilized for the new length of beam.

I Claim:

1. In an adjustable storage rack of the type having at least two pairs of front and rear posts and pairs of front and rear beams having end connecting members detachably mounted on said posts and forming a bay of said storage rack, a construction for increasing the width of said bay comprising separated beam sections with the separation located adjacent ends of all the beams in said bay so that each beam forms at least two nonoverlapping sections, a splice member for each of said beams extending between and overlapping said separated sections, the separation of said beam sections being spaced from said ends to permit said overlap, each of said beams having a central vertical web portion, upper and lower horizontal flange portions, and upper and lower inclined flange portions connecting the horizontal flange portions with the web portion, said splice member having corresponding web and flange portions but with the upper and lower flange portions snugly fitting within the upper and lower flange portions of the beam so as to reinforce the beam in a load-bearing direction, and detachable fastening means comprising bolts passing through the web portions of said beam and splice member to secure the splice member to the beam without carrying any appreciable load as far as the material being supported by the beam is concerned.

2. The combination according to claim 1, further provided with a filler piece having a cross-sectional shape substantially identical with that of said beam and extending between the facing edges thereof, said filler piece overlapping and being detachably secured to said splice member.